United States Patent
Ishii et al.

(10) Patent No.: US 6,563,562 B2
(45) Date of Patent: *May 13, 2003

(54) LIQUID CRYSTAL PANEL WITH HOLDING SUBSTRATE HAVING FIXING PROTUBERANCES

(75) Inventors: Takayuki Ishii, Hiratsuka (JP); Katsumi Kurematsu, Hiratsuka (JP); Osamu Koyama, Hachioji (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 155 days.

(21) Appl. No.: 09/175,323

(22) Filed: Oct. 20, 1998

(65) Prior Publication Data

US 2001/0046025 A1 Nov. 29, 2001

(30) Foreign Application Priority Data

Oct. 24, 1997 (JP) .............................. 9-292903

(51) Int. Cl.⁷ ............................................ G02F 1/1333
(52) U.S. Cl. ....................................................... 349/161
(58) Field of Search ............................. 349/72, 66, 58, 349/95, 161

(56) References Cited

U.S. PATENT DOCUMENTS

| 4,878,742 A | 11/1989 | Ohkubo et al. | 350/347 V |
|---|---|---|---|
| 5,170,195 A | * 12/1992 | Akiyama et al. | 349/161 |
| 5,225,935 A | * 7/1993 | Watanabe et al. | 359/619 |
| 5,404,175 A | * 4/1995 | Nagae et al. | 348/751 |
| 5,505,804 A | * 4/1996 | Mizuguchi et al. | 156/154 |
| 5,554,251 A | * 9/1996 | Watanabe et al. | 156/379.8 |
| 5,606,341 A | * 2/1997 | Aguilera | 349/161 |
| 5,847,795 A | 12/1998 | Satoh et al. | 349/137 |
| 5,978,054 A | * 11/1999 | Fujimori | 349/60 |
| 6,056,407 A | * 5/2000 | Iinuma et al. | 353/119 |

FOREIGN PATENT DOCUMENTS

| EP | 0 773 465 | 5/1997 | |
|---|---|---|---|
| JP | 55-065928 | 5/1980 | |
| JP | 55-108622 | * 8/1980 | |
| JP | 03-278026 | * 12/1991 | 349/113 |
| JP | 05 072514 | 3/1993 | |
| JP | 5-165019 | * 6/1993 | |
| JP | 05-281539 | * 10/1993 | 349/113 |
| JP | 7-084267 | 3/1995 | |
| JP | 8-211351 | 8/1996 | |
| JP | 9-156626 | * 1/1997 | |
| JP | 09-230321 | * 9/1997 | |

* cited by examiner

*Primary Examiner*—Kenneth Parker
(74) *Attorney, Agent, or Firm*—Fitzpatrick, Cella, Harper & Scinto

(57) ABSTRACT

A liquid crystal panel unit comprising an LCD panel having a pair of substrates and a liquid crystal layer arranged between the substrates and a holding substrate for holding the LCD panel by rigidly securing one of the substrates thereto is characterized in that a plurality of protuberances are formed on the surface of the holding substrate at a side thereof and the one of the substrates is rigidly secured to the holding substrate with the side carrying the protuberances facing inside.

15 Claims, 15 Drawing Sheets

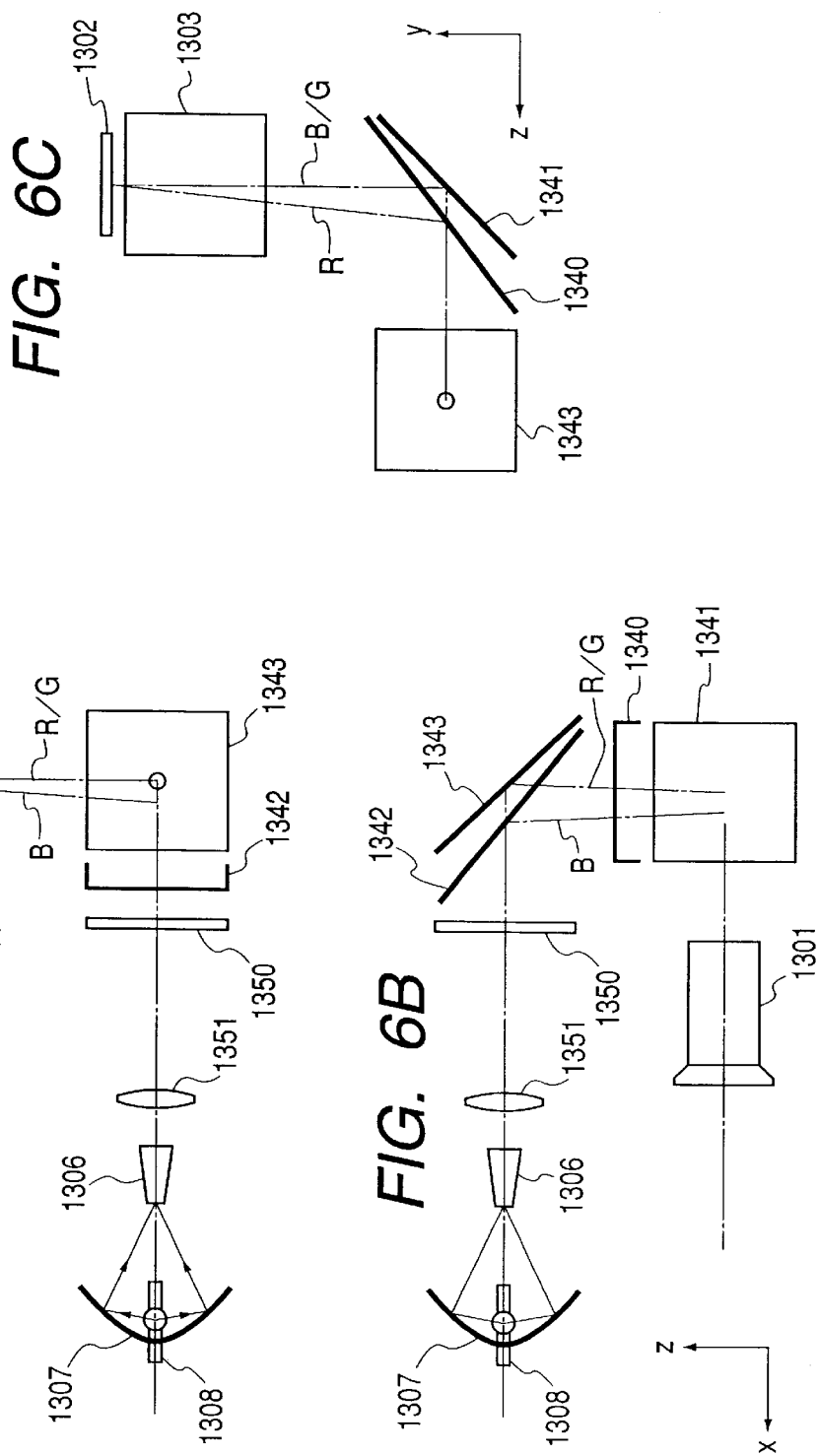

ARBITRARY COLOR OF RGB MIXED COLOR

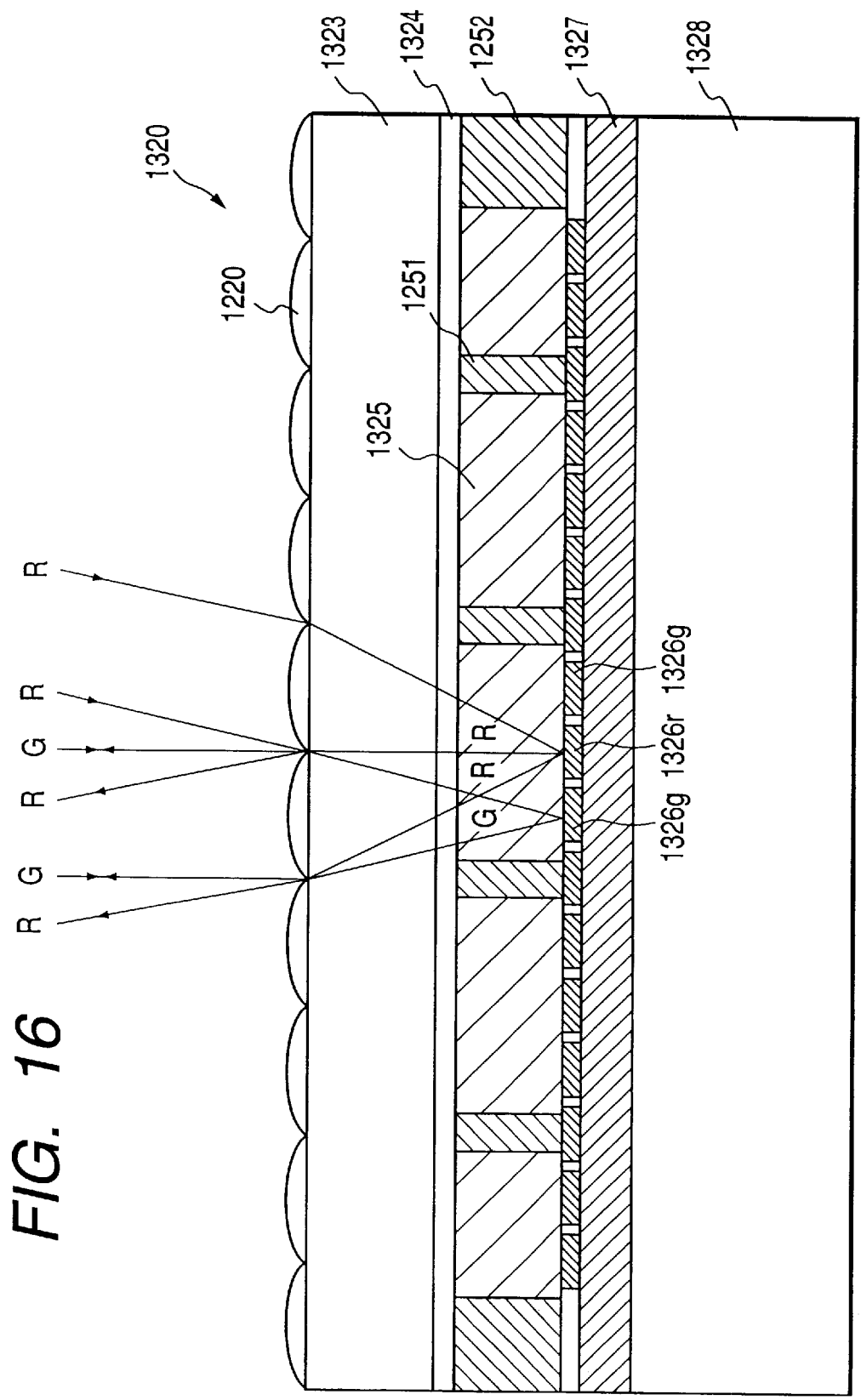

LIQUID CRYSTAL PANEL WITH HOLDING SUBSTRATE HAVING FIXING PROTUBERANCES

BACKGROUND OF THE INVENTION

1. Field of the Invention

This invention relates to a liquid crystal panel unit and also to a liquid crystal projector using such a panel unit. More particularly, the present invention relates to a panel unit applicable to a reflection type LCD panel to be used in the image display section of a projection type image display apparatus such as a linear projection display for audiovisual (AV) applications or a data projector for displaying computer outputs.

2. Related Background Art

FIG. 3 of the accompanying drawings schematically illustrates a known image display apparatus (LCD panel unit) comprising an LCD panel and a substrate for holding the LCD panel (hereinafter referred as holding substrate).

Referring to FIG. 3, the LCD panel 5 is typically constituted by a liquid crystal drive substrate (active matrix substrate) 1 formed by arranging pixel electrodes into a matrix on a semiconductor substrate, an opposite substrate 2 having a transparent electrode and a liquid crystal layer 4 held between the liquid crystal drive substrate 1 and the opposite substrate 2 and securely bonded to said holding substrate 10 by way of an adhesive layer 8.

With the above arrangement, the image displaying surface of the LCD panel 5 can show a varying height within the effective image area of the LCD panel 5 as observed from the rear surface of the holding substrate 10 due to the varying thickness of the adhesive layer 8 held between the LCD panel 5 and the holding substrate 10.

The image projected for viewing by a projection display comprising such an LCD panel unit is in fact an image obtained by magnifying the one produced on the LCD panel 5 by means of the projection lens of the projection display. The sharpness of such an enlarged and projected image is determined, if partly, by the focal point of the image that has to be located on the screen. In other words, the sharpness of the image displayed by the projection display depends on if the image displaying surface of the LCD panel 5 is found within the depth of field of the projection lens or not.

Currently, there is a strong trend of down-sizing the LCD panel by densely arranging dimensionally reduced pixels on the LCD panel in order to meet the demand for high definition images to be realized by down-sized display apparatus. Additionally, to survive the highly competitive scene for the technological development of projection displays, the magnification of the projection lens has to be raised to produce a remarkably enlarged projected image. However, the depth of field of the projection lens is inevitably reduced if the plane of projection is held invariable while the magnification of the projected image is increased. Then, the LCD panel has to be accurately and securely held to the local point of the projection lens. A projection lens with a magnification of fifty times will be required to project an image from a 1-inch LCD panel onto a 50-inch screen, although the magnification may vary depending on the distance of projection and the performance of the lens. Thus, if a projection lens with a magnification of the order of tens is used to produce a bright image, the depth of field of the projection lens will be as small as tens of several microns.

However, as pointed out above, known LCD panels has an image displaying surface that can show a height that varies by tens to hundreds of microns as observed from the rear surface of the holding substrate.

Then, if the distance between the holding substrate and the projection lens is accurate, the projected image can become blurred, although partly.

Meanwhile, a projection display comprising an LCD panel is required to produce a highly bright projected image. Then, light from the light source has to be made to strike the LCD panel with an enhanced intensity. The intensity of light striking the LCD panel is also raised as the LCD panel is dimensionally reduced. As a result, the temperature of the LCD panel will inevitably be raised in operation. In the case of a known LCD panel having a 1.3-inch diagonal and provided with a 250 W metal halide lamp, the temperature of the LCD panel rises to about 40° C. when a thermally not-highly-conductive adhesive agent is used for the adhesive layer of the LCD panel. If the adhesive agent is made to contain a heat-emitting filler material, the temperature rise shows only a limited improvement and the temperature of the LCD panel is raised to about 35° C. in operation.

Therefore, the effect of the adhesive layer arranged between the holding substrate and the LCD panel for emitting heat from the LCD panel to the holding substrate is currently not satisfactory and the temperature rise entails problems including a degraded image quality.

Japanese Patent Application Laid-Open Nos. 55-65928, 7-84267 and 8-211351 disclose the use of spacers between the paired substrates carrying thereon a liquid crystal layer in order to realize a uniform thickness for the liquid crystal layer. However, the above listed patent documents do not refer to any of the above identified problems.

SUMMARY OF THE INVENTION

In view of the above described circumstances, it is therefore an object of the present invention to provide an LCD panel of the above identified type having an image displaying surface that shows a uniform height as observed from the rear surface of holding substrate.

Another object of the present invention is to provide an LCD panel that can effectively reduce its temperature by emitting heat to the holding substrate in operation.

According to the invention, the above objects and other objects of the invention are achieved by providing a liquid crystal panel unit comprising an LCD panel having a pair of substrates and a liquid crystal layer arranged between said substrates and a holding substrate for holding the LCD panel by rigidly securing one of said substrates thereto, characterized in that a plurality of protuberances are formed on the surface of said holding substrate at a side thereof and said one of the substrates is rigidly secured to said holding substrate with the side carrying said protuberances facing inside.

According to the invention, the image displaying section of the LCD panel can be made to show a uniform height as observed from the rear surface of the holding substrate by securing the LCD panel to the holding substrate. With the above arrangement, an enhanced degree of sharpness can be ensured for the projected image over the entire plane of display by controlling the distance between the holding substrate and the projection lens.

Additionally, according to the invention, the protuberances of the holding substrate and the LCD panel may be held in tight contact. According to the invention, it may be so arranged that an adhesive layer containing no filler material is pinched between the flat tops of the protuberances and the LCD panel while an adhesive layer containing a filler material is laid to fill the space unoccupied by the protuberances between the holding substrate and the LCD panel. With such an arrangement, heat can be emitted quickly and efficiently to the holding substrate if the temperature of the LCD panel rises.

The adhesive layer containing a filler material and showing an high thermal conductivity that fills the space unoccupied by the protuberances between the holding substrate and the LCD panel can effectively promote the emission of heat from the LCD panel to the holding substrate and lower the temperature of the LCD panel.

BRIEF DESCRIPTION OF THE DRAWINGS

FIGS. 6A, 6B and 6C are schematic illustrations of an embodiment of the optical system of a projection type liquid crystal display apparatus according to the invention.

FIG. 16 is an enlarged schematic partial cross sectional view of another embodiment of liquid crystal panel according to the invention.

DETAILED DESCRIPTION OF THE PREFERRED EMBODIMENTS

First Embodiment

Figure 1:
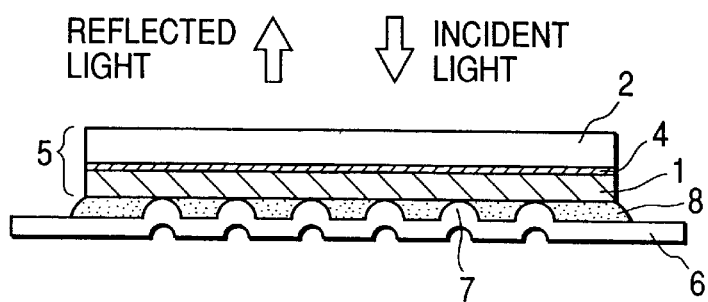
FIG. 1 is a schematic lateral view of a first embodiment of reflection type LCD panel unit according to the invention, illustrating its structure.

Now, a first embodiment of the invention will be described by referring to FIG. 1, which illustrates an LCD panel 5 comprising a liquid crystal drive substrate 1 prepared by means of the semiconductor technology and an opposite substrate 2 having a transparent electrode 3 (not shown) with a liquid crystal layer 4 interposed therebetween.

The LCD panel 5 is held by protuberances 7 formed on a holding substrate 6 and operating as spacers and firmly secured to the latter by means of an adhesive layer 8. The holding substrate 6 is punched out of a sheet of steel containing Ni—Cr alloy by means of a press to define the contour and then protuberances are produced by embossing. The protuberances 7 have the size of about 0.5 mm square and are arranged at regular intervals of 1 mm on the holding substrate 6.

The top of each of the protuberances 7 is scraped off by means of a grinder so that they show a uniform height as observed from the rear surface of the holding substrate 6. For this embodiment, a 0.7 mm thick steel sheet was used for the holding substrate 6, which was embossed to produce protuberances 7 having a height of 0.1 mm and subsequently machined with an accuracy of 0.78±0.01 mm. As a result, a holding substrate 6 having spacers of 0.08±0.01 mm was obtained.

A thermosetting adhesive agent containing a heat emitting filler material (SE3880: tradename, available from Toshiba Silicon) was applied to the surface of the holding substrate 6 except the protuberances 7 produced by embossing while an adhesive agent containing no filler material was applied to the tops of the protuberances 7 and the LCD panel 5 was bonded to the holding substrate 6 by pressing them together with a force of 2 kg for 2 hours at constant temperature of 65° C. to allow the adhesive layer to set. As a result, a reflection type LCD panel unit comprising the LCD panel 5 whose image display surface is held to a position separated from the rear surface of the holding substrate 6 by 1.48±0.01 mm was prepared.

The prepared reflection type LCD panel unit was then fitted to a projection unit and an image was projected onto it from a display apparatus to find that an entirely and perfectly focused sharp image was produced. The temperature rise of the LCD panel 5 did not exceed 25° C. so that the LCD panel 5 kept on displaying a clear projected image and the quality of the displayed image was not degraded with time. For the purpose of the invention, it is recommended to use a metal material for the holding substrate because the material of the holding substrate has to be precision machined. While an appropriate metal material may be selected depending on the requirements to be met by the holding substrate, preferable candidates include copper, aluminum and alloys containing them as principal ingredients particularly when the material of the holding substrate is required to show a high thermal conductivity. Candidate materials having a low coefficient of thermal expansion include alloys of Permalloy (Ni—Cr alloy, 42 alloy, etc.) such as invar alloys.

Second Embodiment

Figure 2:
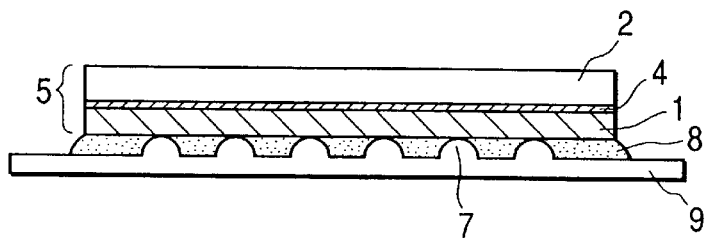
FIG. 2 is a schematic lateral view of a second or third embodiment of reflection type LCD panel unit according to the invention, illustrating its structure.
Figure 3:
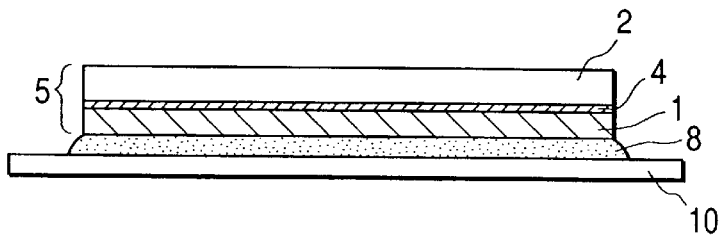
FIG. 3 is a schematic lateral view of a known reflection type LCD panel unit, illustrating its structure.

Now, a second embodiment of the invention will be described by referring to FIG. 2, which illustrates an LCD panel 5 comprising a liquid crystal drive substrate 1 prepared by means of the semiconductor technology and an opposite substrate 2 having a transparent electrode 3 (not shown) with a liquid crystal layer 4 interposed therebetween.

The LCD panel 5 is held by protuberances 7 formed on a holding substrate 9 and operating as spacers and firmly secured to the latter by means of an adhesive layer 8. The holding substrate 9 is produced by aluminum die casting and provided on the surface with protuberances 7. The protuberances 7 have a diameter of about 0.5 mm$\phi$ and are arranged at regular intervals of 1 mm on the holding substrate 9.

The tops the protuberances 7 are worked to make them show a uniform height as observed from the rear surface of the holding substrate 9. For this embodiment, a 0.7 mm thick sheet-like die having 0.1 mm protuberances 7 was prepared and molten aluminum was poured into the die to produce a holding substrate 9 by die casting. The rear surface of the holding substrate 9 and the tops of the protuberances 7 were scraped off and subsequently the holding substrate 9 was subsequently machined with an accuracy of 0.78±0.01 mm. As a result, a holding substrate 9 having spacers of 0.08±0.01 mm was obtained.

A thermosetting adhesive containing a heat emitting filler material (SE3880: tradename, available from Toshiba Silicon) was applied to the surface of the holding substrate 9 except the worked protuberances 7 while an adhesive agent containing no filler material was applied to the tops of the protuberances 7 and the LCD panel 5 was bonded to the holding substrate 9 by pressing them together with a force of 2 kg for 2 hours at constant temperature of 65° C. to allow the adhesive layer to set. As a result, a reflection type LCD panel unit comprising the LCD panel 5 whose image display surface is held to a position separated from the rear surface of the holding substrate 6 by 1.48±0.01 mm was prepared.

The prepared reflection type LCD panel unit was then fitted to a projection unit and an image was projected onto it from a display apparatus to find that an entirely and perfectly focused sharp image was produced. The temperature rise of the LCD panel 5 did not exceed 25° C. so that the LCD panel 5 kept on displaying a clear projected image and the quality of the displayed image was not degraded with time. The second embodiment was rated higher than the first embodiment because the holding substrate was made of aluminum to improve the thermal conductivity.

Third Embodiment

The third embodiment of the invention has a configuration similar to that of the second embodiment. The LCD panel 5 of this embodiment comprises a liquid crystal drive substrate 1 prepared by means of the semiconductor technology and an opposite substrate 2 having a transparent electrode 3 (not shown) with a liquid crystal layer 4 interposed therebetween.

The LCD panel 5 is held by protuberances 7 formed on a holding substrate 9 and operating as spacers and firmly secured to the latter by means of an adhesive layer 8. The holding substrate 9 of the third embodiment is produced by cutting an aluminum blank to produce a holding substrate 9 having protuberances 7 on the surface. The protuberances 7 have a diameter of about 0.5 mm$\phi$ and are arranged at regular intervals of 1 mm on the holding substrate 9.

The tops the protuberances 7 are worked to make them show a uniform height as observed from the rear surface of the holding substrate 9. For this embodiment, a 0.7 mm thick sheet-like die having 0.1 mm protuberances 7 was prepared by cutting an aluminum blank. Additionally, the rear surface of the holding substrate 9 and the tops of the protuberances 7 were scraped off and subsequently the holding substrate 9 was subsequently machined with an accuracy of 0.78±0.01 mm. As a result, a holding substrate 9 having spacers of 0.08±0.01 mm was obtained.

A thermosetting adhesive containing a heat emitting filler material (SE3880: tradename, available from Toshiba Silicon) was applied to the surface of the holding substrate 9 except the worked protuberances 7 while an adhesive agent containing no filler material was applied to the tops of the protuberances 7 and the LCD panel 5 was bonded to the holding substrate 9 by pressing them together with a force of 2 kg for 2 hours at constant temperature of 65° C. to allow the adhesive layer to set. As a result, a reflection type LCD panel unit comprising the LCD panel 5 whose image display surface is held to a position separated from the rear surface of the holding substrate 6 by 148±0.01 mm was prepared.

The prepared reflection type LCD panel unit was then fitted to a projection unit and an image was projected onto it from a display apparatus to find that an entirely and perfectly focused sharp image was produced. The temperature rise of the LCD panel 5 did not exceed 25° C. so that the LCD panel 5 kept on displaying a clear projected image and the quality of the displayed image was not degraded with time. The third embodiment was rated as high as the second embodiment because the holding substrate 9 was made of aluminum to improve the thermal conductivity.

Fourth Embodiment

Figure 4:
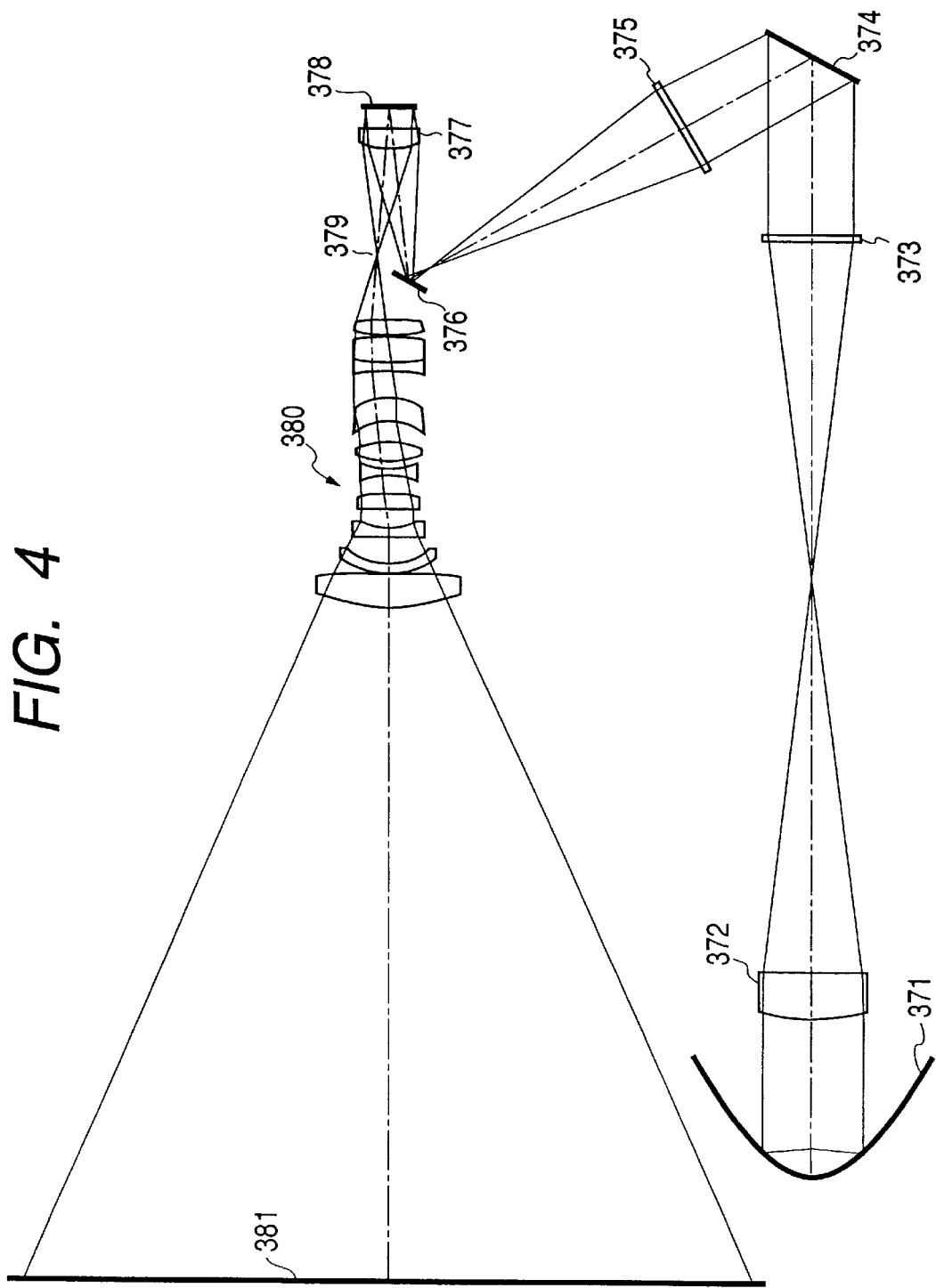
FIG. 4 is a schematic illustration of a liquid crystal projector using a liquid crystal apparatus, showing the underlying concept.

Now, an optical system to which the fourth embodiment of reflection type liquid crystal panel is incorporated will be described by referring to FIG. 4. Referring to FIG. 4, there are shown a light source 371 which may be a halogen lamp, a condenser 372 for converging rays of light coming from the light source, a pair of plane convex Fresnel lenses 373, 375, a color separating optical device 374 for separating light into R, G and B, which may advantageously be a dichroic mirror or a diffraction grating.

There are also shown a mirror unit 376 for leading separated R, G and B lights respectively to R, G and B panels, a finder lens 377 for collimating convergent rays of light before illuminating the reflection type liquid crystal panel, a reflection type liquid crystal device 378 having an LCD panel unit arranged at a predetermined position as described above by referring to the first through third embodiments and a diaphragm section 379. Additionally, there are also shown a projection lens 380 realized by combining a plurality of lens to operate as magnifier and a screen 381 that can display clear, bright and contrasty images when constituted by a Fresnel lens for collimating projected light and a lenticular lens for providing a wide viewing angle both vertically and horizontally. Note that, while FIG. 4 illustrates only a single panel for a single color, rays of light of three separated colors proceeds between the color separating optical device 374 and the diaphragm section 379 and actually three panels are required. However, it may be needless to say that the three panels can be replaced by a single panel by arranging a micro-lens array on the surface of the panel of the reflection type liquid crystal device to make different rays of incident light strike respectively different pixel regions. As a voltage is applied to the liquid crystal layer of the liquid crystal device, rays of light reflected by the pixels passes the diaphragm section 379 before they are projected onto the screen.

While no voltage is applied and the liquid crystal is a scattering body, rays of light entering the reflection type liquid crystal device are scattered isotropically so that only scattered rays of light directed to the aperture of the diaphragm section 379 can enter the projection lens. Only black will be displayed under this condition. As will be understood from the above description on the optical system, no polarization panel is required for the system. Additionally, since signal light is reflected by the entire surface of the pixel electrode before entering the projection lens, this arrangement can display an image brighter by two to three times than any comparable conventional arrangement. As described above, anti-reflection measures are taken on the surface and the interface of the opposite substrate so that noise factors are minimized for light and contrasty images can be displayed on the screen. Additionally, all the optical devices (lenses, mirrors, etc.) can be down-sized to reduce the cost and the weight because a small panel can be used.

Shadings and fluctuations of light and color of the light source can be prevented from being reflected on the screen by arranging an integrator (fly eye lens type, rod type) between the light source and the optical system.

Figure 5:
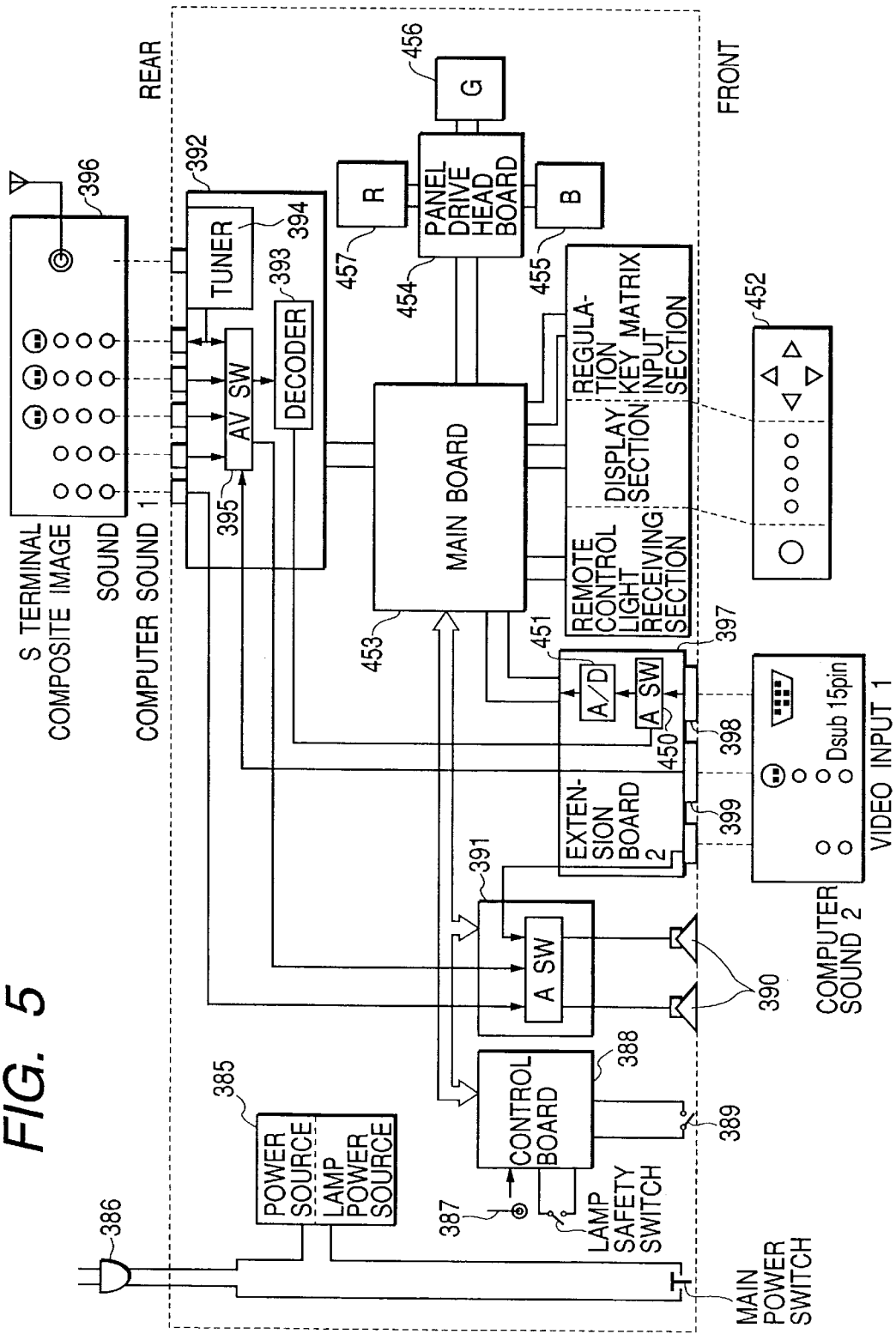
FIG. 5 is a schematic block diagram of the internal circuit of a liquid crystal projector according to the invention.

Now, the peripheral electric circuit other than the liquid crystal panel will be described by referring to FIG. 5. In FIG. 5, there are shown a bipartite power source 385 for supplying power to the lamps and also to the drive system for driving the panels and the signal processing circuit, a plug 386 and a lamp temperature sensor 387 adapted to cause the control board 388 to deenergize any lamps whose temperature is detected to be abnormal. The filter safety switch 389 is also controlled by the control board 388. For example, if the lamp house box show high temperature, the box cannot be opened by way of precaution. Reference numeral 390 denotes a loudspeaker and reference numeral 391 denotes a sound board that can contain a processor for 3D sounds and surround sounds if required. Reference numeral 392 denotes extension board 1 having input terminals for receiving signals from S terminals and other external sources 396 of signals for composite images and sounds, a selection switch 395 for selecting a signal and a tuner 394. Signals are sent from there to extension board 2 by way of a decoder 393. The extension board 2 has Dsub15 pin terminals to be connected to external video signal sources and computers and signals are converted into digital signals by an A/D converter 451 by way of a switch 450 for selecting the video signal from the decoder 393.

Reference numeral 453 denotes a main board comprising a CPU and memories including a video RAM as principal components. The NTSC signals subjected to A/D conversion by the A/D converter 451 are temporarily stored in a memory and additional signals are generated by interpolation for vacant liquid crystal elements to satisfactorily assign signals to the large number of pixels for high definition, while other signal processing operations proceed, including gamma conversion edge gradation, brightness adjustment and bias adjustment. If high resolution XGA panels are used and computer signals such as VGA signals are applied in stead of NTSC signals, a resolution conversion processing operation will also be conducted on the main board. The main board 453 also operate for synthetically combining NTSC signals of data not only for a single image but also for a plurality of images with computer signals. The output of the main board 453 is subjected to a serial/parallel conversion and applied to the head board 454 in a form less adversely affected by noises. The head board 454 operates for carrying out a parallel/serial conversion and a D/A conversion for the output signal, which is divided according to the number of video lines of the panels and the signal is written onto the liquid crystal panels 455, 456 and 457 of B, G and R by means of respective drive amplifiers. Reference numeral 452 denotes a remote control panel with which computer images can be manipulated like TV images. The liquid crystal panels 455, 456 and 457 have an identical configuration that are same as the liquid crystal (LCD) panel described above for each of the first through third embodiments and provided with respective color filters of the corresponding colors. As described above, this embodiment of display apparatus can display neat and clear images.

Fifth Embodiment

FIGS. 6A, 6B and 6C are schematic illustrations of an embodiment of the optical system of a front and back projection type liquid crystal display apparatus according to the invention. FIG. 6A shows a plan view, FIG. 6B shows a front view and FIG. 6C shows a side view. Referring to FIGS. 6A, 6B and 6C, ther are shown a projection lens 1301 for projecting an image on the screen, a liquid crystal panel 1302 having a micro-lens, a polarization beam splitter (PBS) 1303, an R (red light) reflecting dichoric mirror 1340, a B/G (blue and green light) reflecting dichroic mirror 1341, a B (blue light) reflecting dichroic mirror 1342, a white light reflecting high reflection mirror 1343, a Fresnel lens 1350, a convex lens 1351, a rod type integrator 1306, an elliptic reflector 1307, an arc lamp 1308 of, for example, metal halide or UHP. Note that the R (red light) reflecting dichroic mirror 1340, the B/G (blue and green light) reflecting dichroic mirror 1341 and the B (blue light) reflecting dichroic mirror 1342 have respective spectrum reflection characteristics illustrated in FIGS. 7A, 7B and 7C. The dichroic mirrors and the high reflection mirror 1343 are three-dimensionally arranged as shown in the perspective view of FIG. 8 to divide illuminated white light and separate R, G and B light as will be described hereinafter and cause rays of light of the three primary colors to irradiate the liquid crystal panel 1302 with respective angles that are three-dimensionally different from each other.

The operation of the optical system will be described in terms of the proceeding route of a flux of light. Firstly, the flux of light emitted from the lamp 1308 of the light source of the system is that of white light and converged by the elliptic reflector 1307 toward the inlet port of the integrator 1306 arranged in front of it. As the flux of light proceeds through the integrator 1306 with repeated reflections, the spatial intensity distribution of the flux of light is uniformized. After coming out of the integrator 1306, the flux of light is collimated along the x-direction (as shown in the front view of FIG. 6B) by the convex lens 1351 and the Fresnel lens 1350 before getting to the B reflecting dichroic mirror 1342. Only B light (blue light) is reflected by the B reflecting dichroic mirror 1342 and directed to the R reflecting dichroic mirror 1340 along the z-axis or downwardly in FIG. 6B, showing a predetermined angle relative to the z-axis.

Meanwhile, light than B light (R/G light) passes through the B reflecting dichroic mirror 1342 and reflected rectangularly by the high reflection mirror 1343 into the direction of the z-axis (downwardly) and also directed to the R reflecting dichroic mirror 1340. Referring to the front view of FIG. 6A, both the B reflecting dichroic mirror 1342 and the high reflection mirror 1343 are arranged to reflect the flux of light coming from the integrator 1306 (along the direction of the x-axis) into the direction of the z-axis (downwardly), the high reflection mirror 1343 being tilted around the axis of rotation, or the y-axis, exactly by 45 relative to the x-y plane. On the other hand, the B reflecting dichroic mirror 1342 is tilted around the axis of rotation, or the y-axis, by an angle less than 45° relative to the x-y plane. Thus, while R/G light reflected by the high reflection mirror 1343 is directed rectangularly toward the z-axis, B light reflected by the B reflecting dichroic mirror 1342 is directed downwardly, showing a predetermined angle relative to the z-axis (tilted in the x-z plane). Note that the extent of shifting the high reflection mirror 1343 and the B reflecting dichroic mirror 1342 relative to each other and the angle of tilt of the B reflecting dichroic mirror will be so selected that the principal beams of light of the three primary colors intersect each other on the liquid crystal panel 1302 in order to make B light and R/B light show an identical coverage on the liquid crystal panel 1302.

The downwardly directed fluxes of R/G/B light (along the z-axis) then proceeds to the R reflecting dichroic mirror 1340 and the B/G reflecting dichroic mirror 1341, which are located below the B reflecting dichroic mirror 1342 and the high reflection mirror 1343. The B/G reflecting dichroic mirror 1341 is tilted around the axis of rotation, or the x-axis by 450 relative to the x-z plane, whereas the R reflecting dichroic mirror 1340 is tilted around the axis of rotation, or the x-axis, by an angle less than 45° relative to the x-z plane. Thus, of the incoming fluxes of R/G/B light, those of B/G light firstly pass through the R reflecting dichroic mirror 1340 and reflected rectangularly by the B/G reflecting dichroic mirror 1341 into the positive direction of the y-axis before they are polarized and illuminate the liquid crystal panel 1302 arranged horizontally on the x-z plane. Of the fluxes of B/G light, that of B light shows a predetermined angle relative to the x-axis (tilted in the x-z plane) so that, after having been reflected by the B/G reflecting dichroic mirror 1341, it maintains the predetermined angle relative to the y-axis (tilted in the x-y plane) and illuminates the liquid crystal panel 1302 with an angle of incidence equal to the predetermined angle (relative to the x-y plane).

On the other hand, the flux of G light is reflected rectangularly by the B/G reflecting dichroic mirror 1341 and proceeds into the positive direction of the y-axis before it is polarized and hits the liquid crystal panel 1302 perpendicularly with an angle of incidence of 0°. The flux of R light is reflected by the R reflecting dichroic mirror 1340 which is arranged upstream relative to the B/G reflecting dichroic mirror 1341 as pointed out above into the positive direction of the y-axis and proceeds along the positive direction of the y-axis, showing a predetermined angle relative to the y-axis (titled in the y-z plane) as shown in FIG. 6C (lateral view) before it is polarized by the PBS 1303 and hits the liquid crystal panel 1302 with an angle incidence equal to the predetermined angle (relative to the y-z plane). As pointed out above, the extent of shifting the B/G reflecting dichroic mirror 1341 and the R reflecting dichroic mirror 1340 relative to each other and the angle of tilt of the R reflecting dichroic mirror will be so selected that the principal beams of light of the three primary colors intersect each other on the liquid crystal panel 1302 in order to make the fluxes of R/G/B light show an identical coverage on the liquid crystal panel 1302.

Figure 7A:
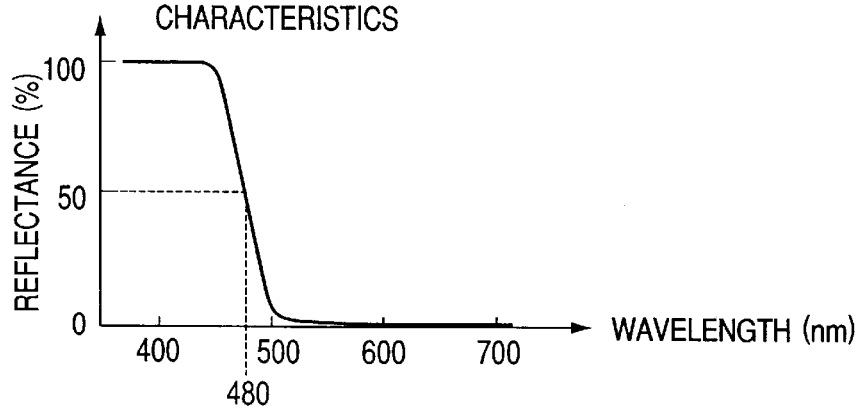
FIGS. 7A, 7B and 7C are graphs showing the spectrum reflection characteristics of the reflective dichroic mirrors selectively used for the optical system of a projection type liquid crystal display apparatus according to the invention.
Figure 7B:
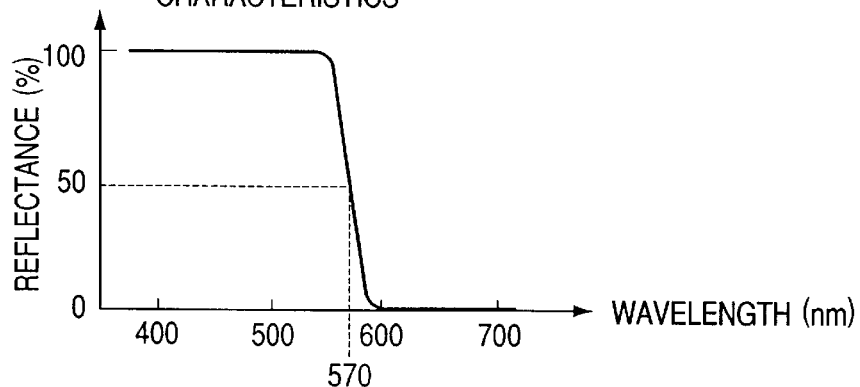
Figure 7C:
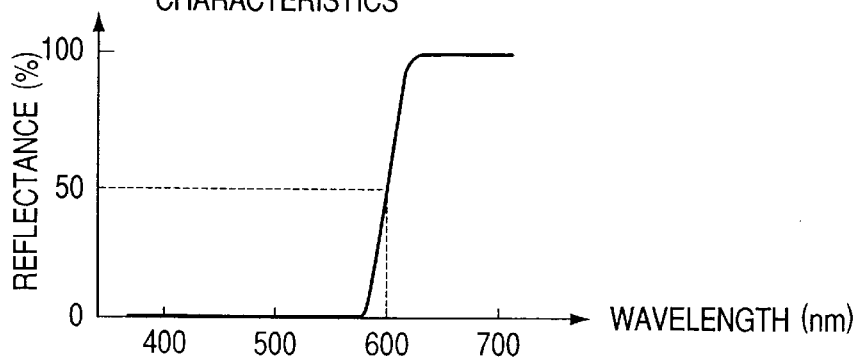
Figure 8:
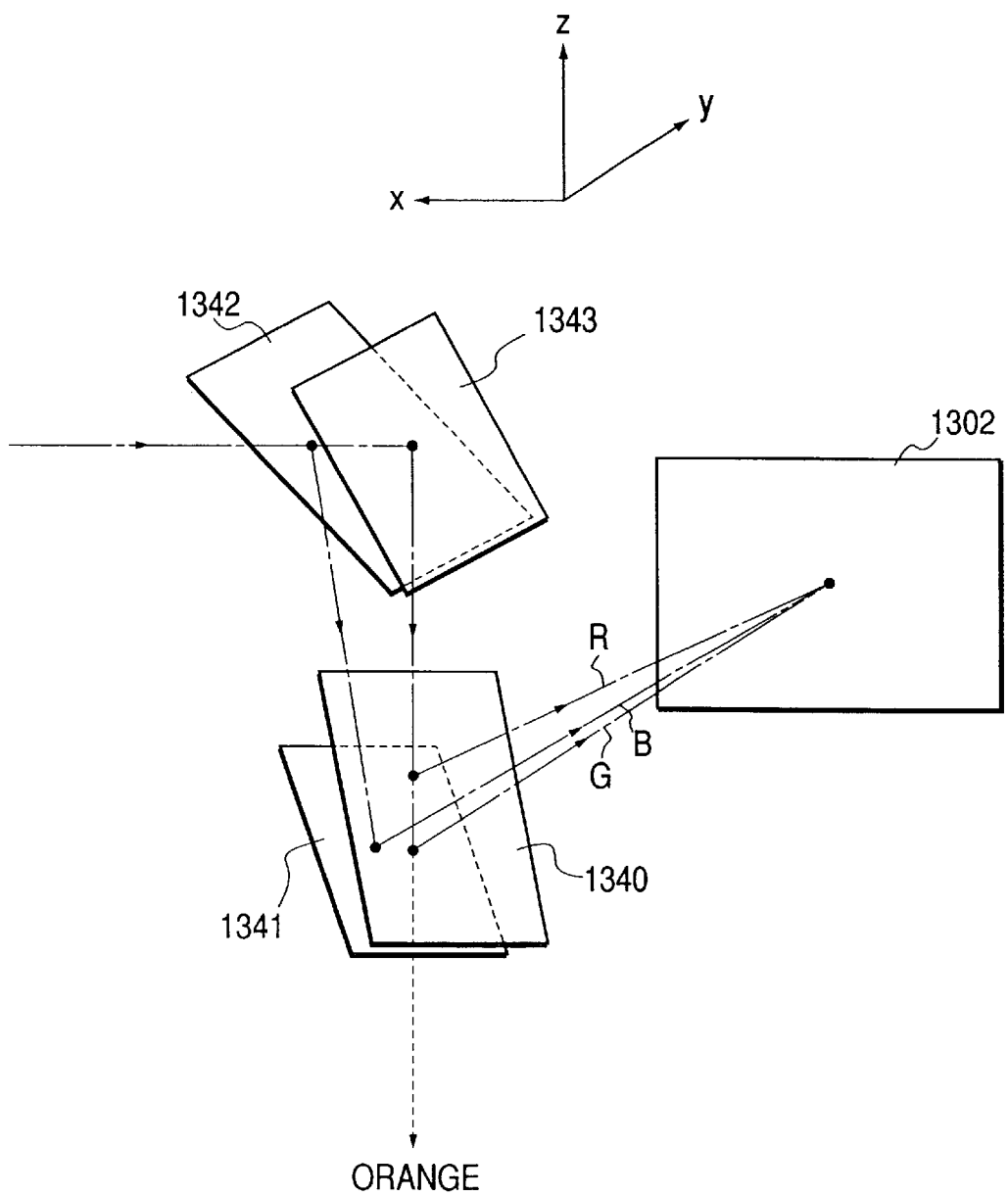
FIG. 8 is a schematic perspective view of the color separation illumination section of the optical system of a projection type liquid crystal display apparatus according to the invention.

Referring to FIGS. 7A, 7B and 7C, the cutting frequency of the B reflecting dichroic mirror 1342 is 480 nm as shown in FIG. 7A and that of the B/G reflecting dichroic mirror 1341 is 570 nm as shown in FIG. 7B, whereas that of the R reflecting dichroic mirror 1340 is 600 nm. Thus, unnecessary orange light is discarded after passing through the B/G reflecting dichroic mirror 1341 to realize an optimal color balance.

As described in greater detail hereinafter, rays of R/G/B light are reflected and polarized for modulation by the liquid crystal panel 1302 and return to the PBS 1303, where the fluxes reflected into the positive direction of the x-axis by the PBS plane 1303a of the PBS 1303 are used as light for producing enlarged and projected images on the screen (not shown) by way of the projection lens 1301. Since the fluxes of R/G/B light striking the liquid crystal panel 1302 have respective angles of incidence that are different from each other, the fluxes of light reflected by it and coming out therefrom shows respective angles that are also different from each other. However, the projection lens 1301 has a lens diameter and an aperture that are large enough for accommodating the differences. Note that the fluxes of light striking the projection lens 1301 are collimated as they pass through the micro-lens array twice per each to maintain a predetermined angle for striking the liquid crystal panel 1302.

Figure 14:
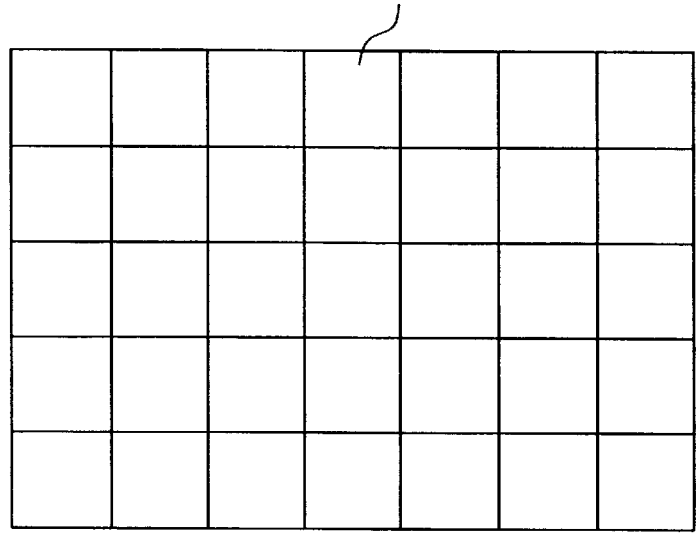
FIG. 14 is an enlarged partial plan view of an image projected on the display screen of a projection type liquid crystal display apparatus according to the invention.
Figures 18, 19:
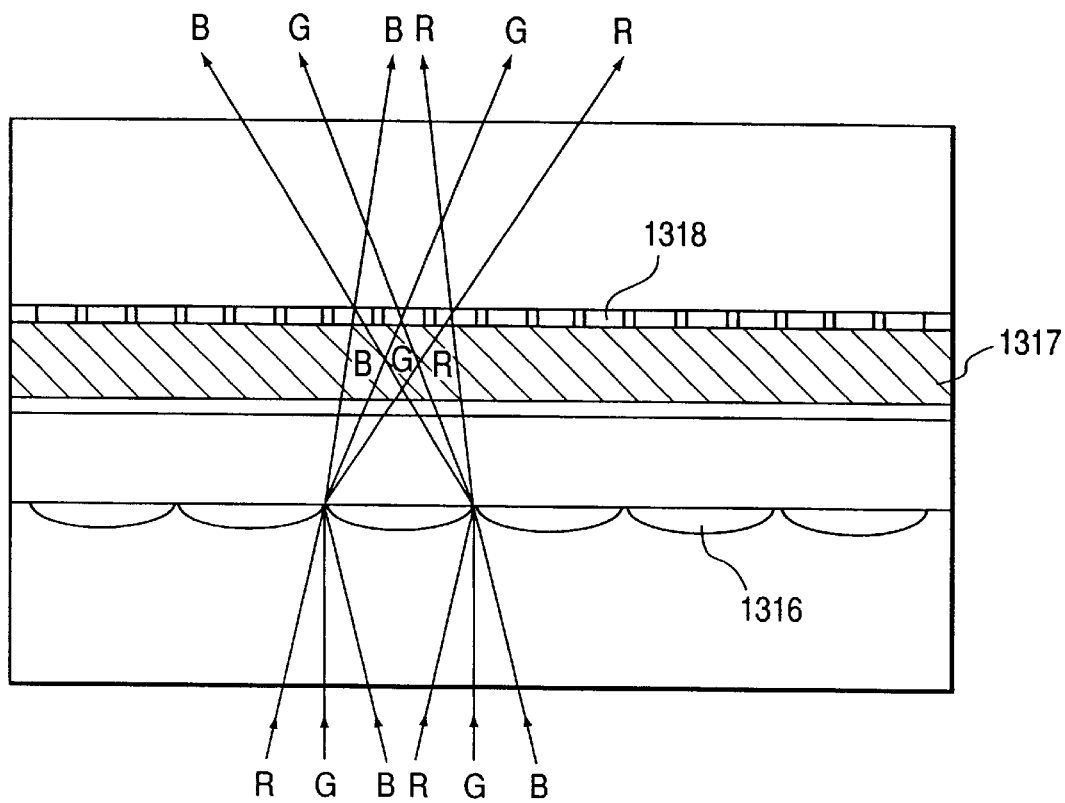
FIG. 18 is a schematic illustration of the liquid crystal panel of a liquid crystal apparatus, showing how fluxes of light proceed.
FIG. 19 is a schematic illustration of the arrangement of color pixels of the liquid crystal panel of a liquid crystal apparatus.

With a known transmission type liquid crystal display apparatus as shown in FIG. 14, the flux of light exiting the liquid crystal panel is diametrically significantly enlarged partly due to the converging effect of the micro-lens array so that the projection lens for catching the flux is required to have a greater numerical aperture, making the projection lens costly. On the other hand, with this embodiment, the expansion of the flux of light coming from the liquid crystal panel 2 is relatively limited so that a sufficiently bright image can be projected on the screen by using a projection lens having a relatively small numerical aperture. While a stripe type display mode using vertically long stripes of same colors as shown in FIG. 19 may be used for this embodiment, such a mode of display is not preferable for a liquid crystal panel using a micro-lens array as will be described hereinafter.

Figure 9:
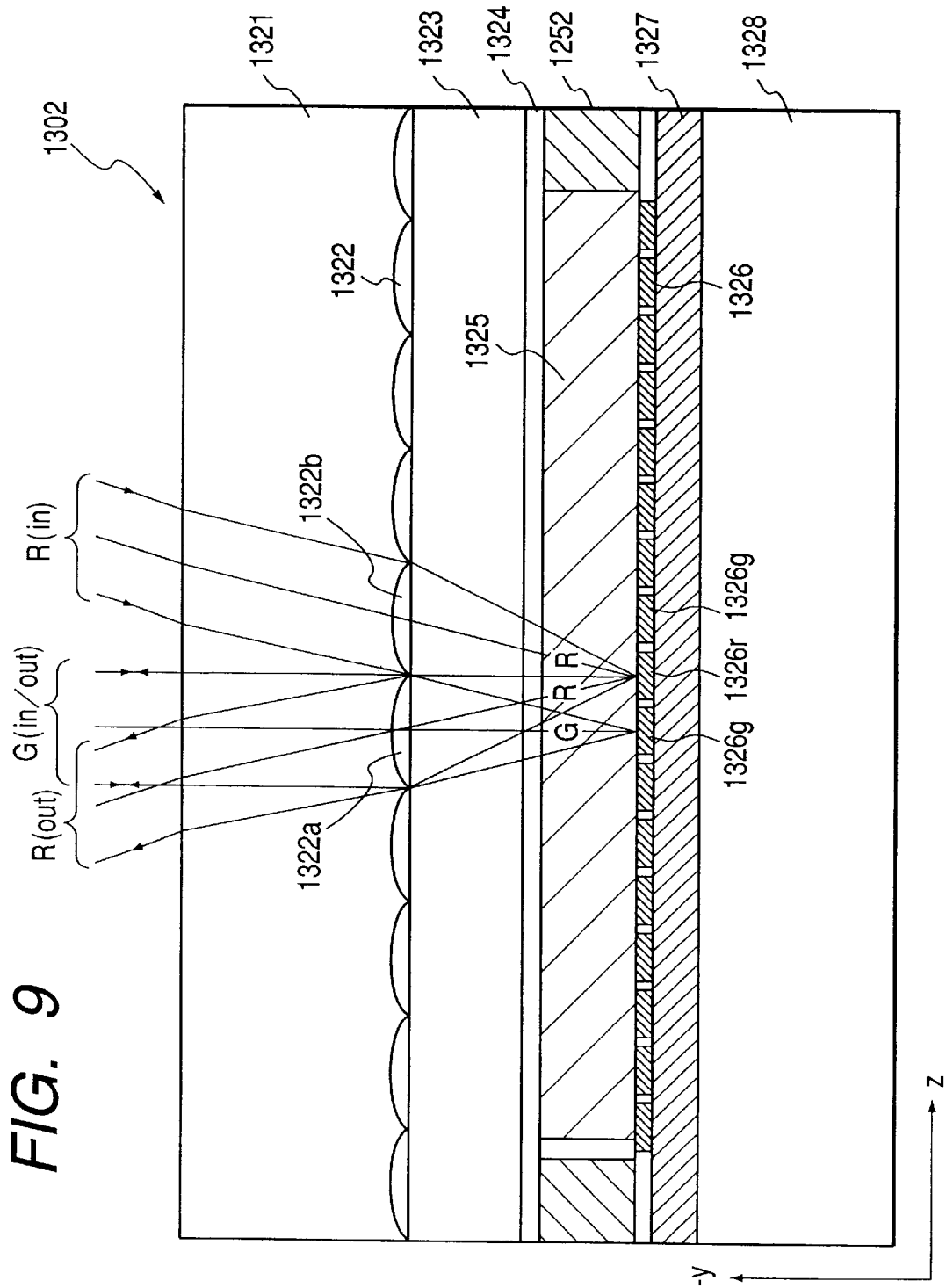
FIG. 9 is a schematic cross sectional view of an embodiment of liquid crystal panel according to the invention.

Now, the liquid crystal panel 1302 of this embodiment will be described. FIG. 9 is an enlarged schematic cross sectional view of the liquid crystal panel 1302 (taken along the y-z plane of FIG. 8). Referring to FIG. 9, there are shown a micro-lens substrate 1321, a number of micro-lenses 1322, a sheet glass 1323, a transparent opposite electrode 1324, a liquid crystal layer 1325, a number of pixel electrodes 1326, an active matrix drive circuit 1327 and a silicon semiconductor substrate 1328. Reference numeral 1352 denotes a peripheral seal section. In this embodiment, R, G and B pixels are intensively arranged on a single panel so that each single pixel inevitably has reduced dimensions. Thus, it is important that the panel shows a large aperture ratio and a reflection electrode should be found within the area covered by converged light so that the use of any of the arrangements of the first through fifth embodiments is significant for this embodiment. The micro-lenses 1322 are formed on the surface of a glass substrate (alkali glass) 1321 by means of a so-called ion-exchange technique and arranged in two-dimensional array at a pitch twice as high as that of the pixel electrodes 1326.

ECB mode nematic liquid crystal such as DAP or HAN that is adapted to a reflection type display is used for the liquid crystal layer 1325 and a predetermined orientation is maintained by means of an orientation layer (not shown). It will be appreciated that the circuit configuration and other arrangement of this invention is highly effective particularly for this embodiment because a voltage lower than its counterpart of the fourth embodiment is used in this embodiment and hence the accuracy of the potential of the pixel electrodes 1326 is highly important. Additionally, the LCD panel unit of any of the first through third embodiments may effectively be used for this embodiment because a large number of pixels are arranged on a single panel in this embodiment. The pixel electrodes 1326 are made of aluminum and operate as reflector. Therefore, they are processed by a so-called CMP treatment technique after the patterning operation in order to improve the smoothness and the reflectivity of the surface.

The active matrix drive circuit 1327 is a semiconductor circuit arranged on the silicon semiconductor substrate 1328 to drive the pixel electrodes 1326 in an active matrix drive mode. Thus, gate line drivers (vertical registers, etc.) and signal line drivers (horizontal registers, etc.) (not shown) are arranged in the peripheral area of the circuit matrix (as will be discussed in detail hereinafter). The peripheral drivers and the active matrix drive circuit are so arranged as to write primary color video signals of RGB on the respective RGB pixels in a predetermined fashion. Although the pixel electrodes 1326 are not provided with color filters, they are identified respectively as RGB pixels by the primary color image signals to be written onto them by said active matrix drive circuit as they are arranged in array.

Take, for example, rays of G light that illuminate the liquid crystal panel 1302. As described above, G light is polarized by the PBS 1303 and then perpendicularly strikes the liquid crystal panel 1302. FIG. 9 shows a beam of G light that enters the micro-lens 1322a in a manner as indicated by arrow G (in/out). As shown, the beam of G light is converged by the micro-lens 1322 to illuminate the surface of the G pixel electrode 1326g before it is reflected by the aluminum-made pixel electrode 1326G and goes out of the panel through the same micro-lens 1322a. As the beam of G light (polarized light) moves through the liquid crystal layer 1325, it is modulated by the electric field generated between the pixel electrode 1326g and the opposite electrode 1324 by the signal voltage applied to the pixel electrode 1326g before it returns to the PBS 1303.

Thus, the quantity of light reflected by the PBS surface 1303a and directed to the projection lens 1301 changes depending on the extent of modulation to define the gradation of the related pixel. On the other hand, R light enters the cross sectional plane (the y-z plane) of FIG. 9 slantly in a manner as described above after having been polarized by the PBS 1303. Take, now, a beam of R light striking the micro-lens 1322b. It is converged by the micro-lens 1322b in a manner as indicated by arrow R (in) in FIG. 9 to illuminate the surface of the R pixel electrode 1326r located at a position shifted to the left in FIG. 9 from the spot right below it before it is reflected by the pixel electrode 1326r and goes out of the panel through the adjacently located micro-lens 1322a (in the negative direction of the z-axis) (R(out)).

As in the case of G light described above, as the beam of R light (polarized light) moves through the liquid crystal layer, it is modulated by the electric field generated between the pixel electrode 1326r and the opposite electrode 1324 by the signal voltage applied to the pixel electrode 1326r before it goes out of the liquid crystal panel and returns to the PBS 1303. Then, as described above in terms of G light, light from the pixel is projected through the projection lens 1301. While the beams of G light and R light on the pixel electrodes 1326g and 1326r may appear overlapping and interfering with each other in FIG. 9, it is because the liquid crystal layer is shown excessively thick, although it has a thickness between 1 and 5 $\mu$m in reality, which is very small if compared with the sheet glass 1323 having a thickness between 50 and 100 $\mu$m so that no such interference actually takes place regardless of the size of each pixel.

Figure 10A:
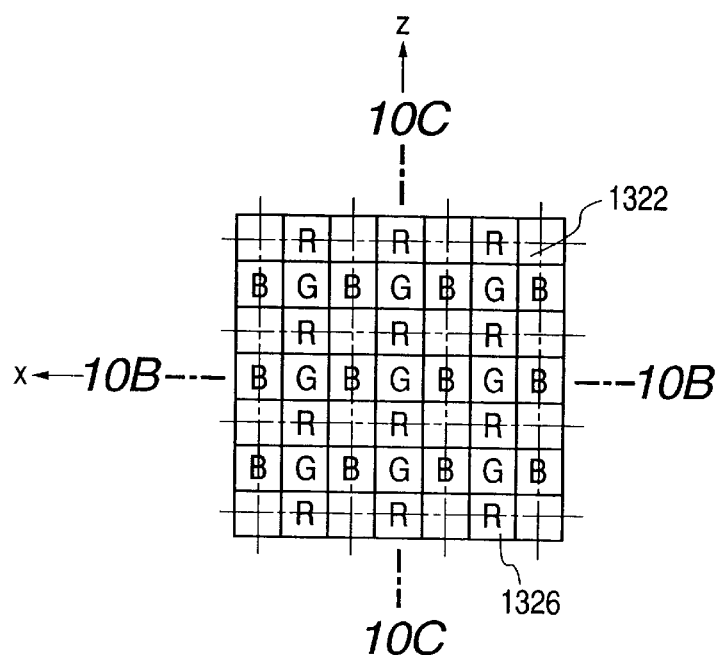
FIGS. 10A, 10B and 10C are schematic illustrations of the principle of color separation and color synthesis, underlying a liquid crystal panel according to the invention.
Figure 10C:
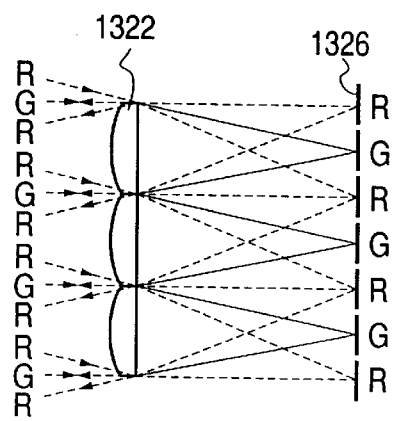
Figure 10B:
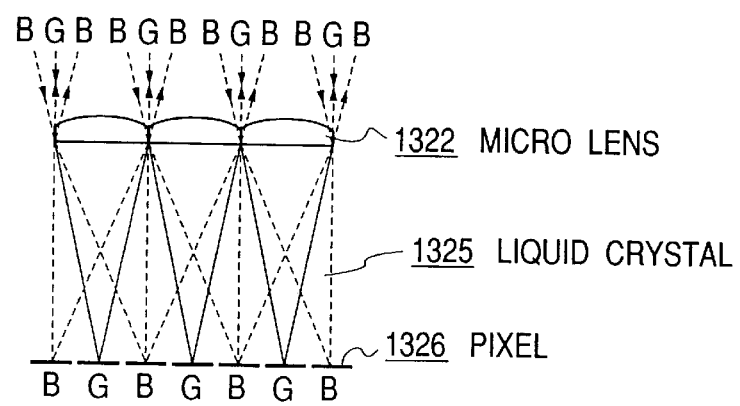

FIGS. 10A, 10B and 10C are schematic illustrations of the principle of color separation and color synthesis, underlying the liquid crystal panel 1302 of this embodiment. FIG. 10A is a schematic plan view of the liquid crystal panel, whereas FIGS. 10B and 10C respectively show schematic cross sectional views taken along line 10B—10B (along the x-direction) and line 10C—10C (along the z-direction) of FIG. 10A. As indicated by dotted broken lines in FIG. 10A, each micro-lens 1322 corresponds to a half of a set of two-color pixels adjacently located with a G light pixel arranged at the center. Note that FIG. 10C corresponds to the cross sectional view of FIG. 9 taken along the y-z plane and shows how beams of G light and R light enter and go out from the respective micro-lenses 1322. As seen, each G pixel electrode is located right below a corresponding micro-lens and each R pixel electrode is located right below the boundary line of corresponding two adjacent micro-lenses. Therefore, the angle of incidence $\theta$ of R light is preferably so selected that $\tan \theta$ is equal to the ratio of the pitch of pixel arrangement (B and R pixels) to the distance between the micro-lenses and the pixel electrode. On the other hand, FIG. 10B corresponds to a cross section of the liquid crystal panel 1302 taken along the x-y plane. As for the cross section along the x-y plane, it will be understood that B pixel electrodes and G pixel electrodes are arranged alternately as shown in FIG. 10C and each G pixel electrode is located right below a corresponding micro-lens whereas each B pixel electrode is located right below the boundary line of corresponding two adjacent micro-lenses.

B light for irradiating the liquid crystal panel enters the latter slantly as viewed from the cross section (the x-y plane) of FIGS. 6A, 6B and 6C after having been polarized by the PBS 1303 as described above. Thus, just like R light, each beam of B light entering from a corresponding micro-lens 1322 is reflected by a corresponding B pixel electrode 1326b as shown and goes out of the panel through the adjacently located micro-lens 1322 in the x-direction. The mode of modulation by the liquid crystal on the B pixel electrodes 1326b and that of projection of B light coming out of the liquid crystal panel are same as those described above by referring to G light and R light.

Each B pixel electrode 1326 is located right below the boundary line of corresponding two adjacent micro-lenses. Therefore, the angle of incidence $\theta$ of B light is preferably so selected that $\tan \theta$ is equal to the ratio of the pitch of pixel arrangement (G and B pixels) to the distance between the micro-lenses and the pixel electrode. The pixels of the liquid crystal panel of this embodiment are arranged RGRGRG . . . in the z-direction and BGBGBG . . . in the x-direction. FIG. 10A shows the pixel arrangement as viewed from above. As seen, each pixel has a size equal to a half of a micro-lens for both longitudinally and transversally so that the pixels are arranged at a pitch twice as high as the micro-lenses. As viewed from above, each G pixel is located right below a corresponding micro-lens, while each R pixel is located right below the boundary line of corresponding two adjacent micro-lenses in the z-direction and each B pixel is located right below the boundary line of corresponding two adjacent micro-lenses in the x-direction. Each micro-lens has a rectangular contour (and is twice as large as a pixel).

Figure 11:
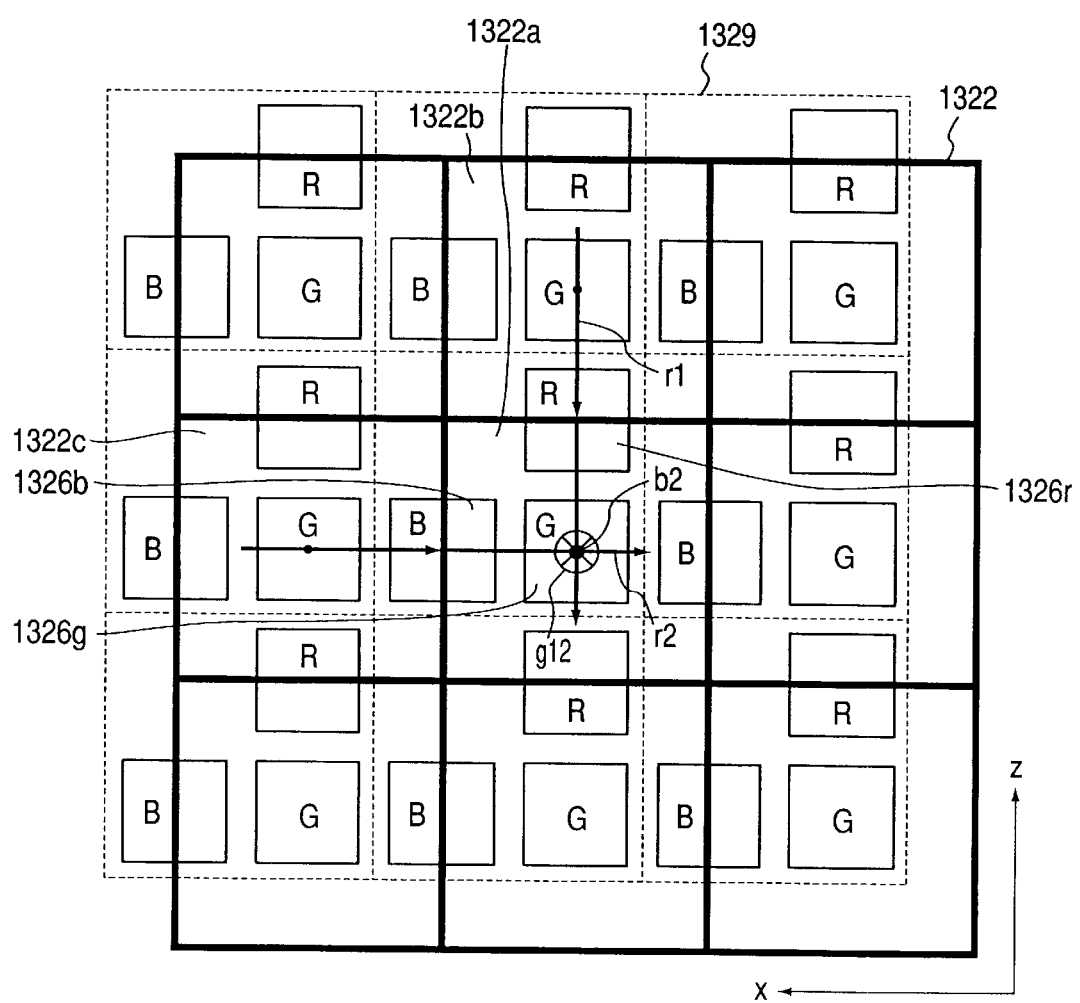
FIG. 11 is an enlarged partial plan view of an embodiment of liquid crystal panel according to the invention.
Figure 12:
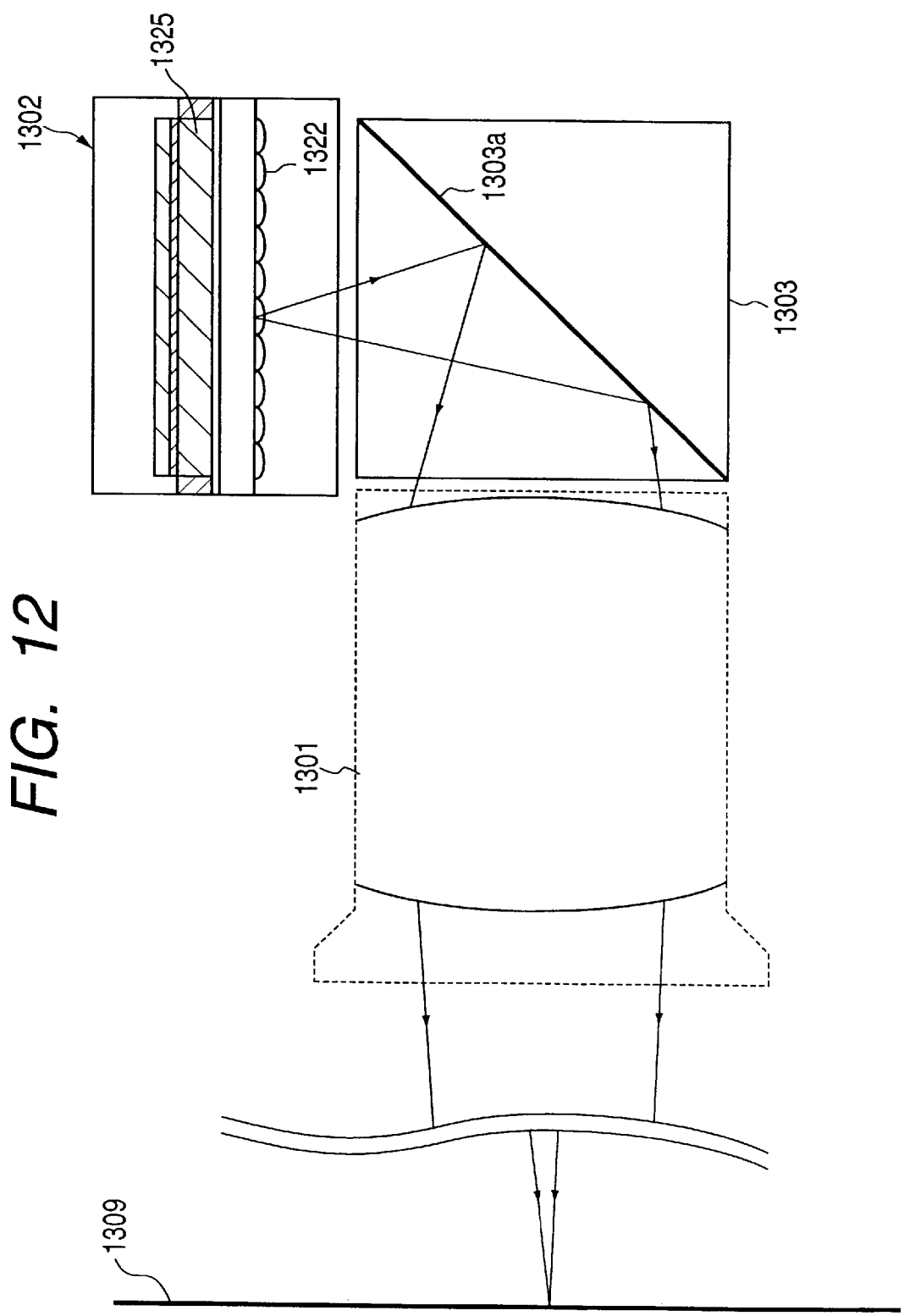
FIG. 12 is a schematic illustration of part of the projection optical system of a projection type liquid crystal display apparatus according to the invention.

FIG. 11 is an enlarged partial plan view of the liquid crystal panel of this embodiment. Each square 1329 defined by broken lines indicates a unit of RGB pixels. In other words, when the RGB pixels of the liquid crystal panel are driven by the active matrix drive circuit section 1327, the unit of RGB pixels in each broken line square 1329 is driven by corresponding RGB picture signals. Now, take the picture unit of R pixel electrode 1326r, G pixel electrode 1326g and B pixel electrode 1326b. The R pixel electrode 1326r is illuminated by R light coming from the micro-lens 1322b and striking the pixel electrode aslant as indicated by arrow r1 and reflected R light goes out through the micro-lens 1322a as indicated by arrow r2. The B pixel electrode 1326b is illuminated by B light coming from the micro-lens 1322c and striking the pixel electrode aslant as indicated by arrow b and reflected B light goes out through the micro-lens 1326a as indicated by arrow b2. Finally, the G pixel electrode 1326g is illuminated by G light coming from the micro-lens 1322a and striking the pixel electrode perpendicularly (downwardly in FIG. 11) as indicated by arrow g12 showing only the back and reflected G light goes out through the same micro-lens 1322a perpendicularly (upwardly in FIG. 11).

Thus, while the beams of light of the three primary colors striking the picture unit of RGB pixels enters through different micro-lenses, they go out through a same micro-lens (1322a). The above description applies to all the picture unit (of RGB pixels) of the embodiment.

Therefore, when light emitted from the liquid crystal panel of this embodiment is projected onto the screen 1309 by way of the PBS 1303 and the projection lens 1301 in such a way that a focused image of the micro-lenses 1322 of the liquid crystal panel 1302 is projected on the screen by regulating the optical system, the projected image will show the picture units of RGB pixels for the corresponding respective micro-lenses as perfect white light obtained by mixing the beams of light of the three primary colors. The net result will be the display of high quality color images free from the mosaic of RGB as shown in FIG. 19 for a conventional liquid crystal panel.

As the active matrix drive circuit 1327 is located under the pixel electrodes 1326 as shown in FIG. 9, the drain of each pixel FET is connected to the corresponding one of the RGB pixel electrode electrodes arranged two-dimensionally as shown in FIG. 11.

Figure 13:
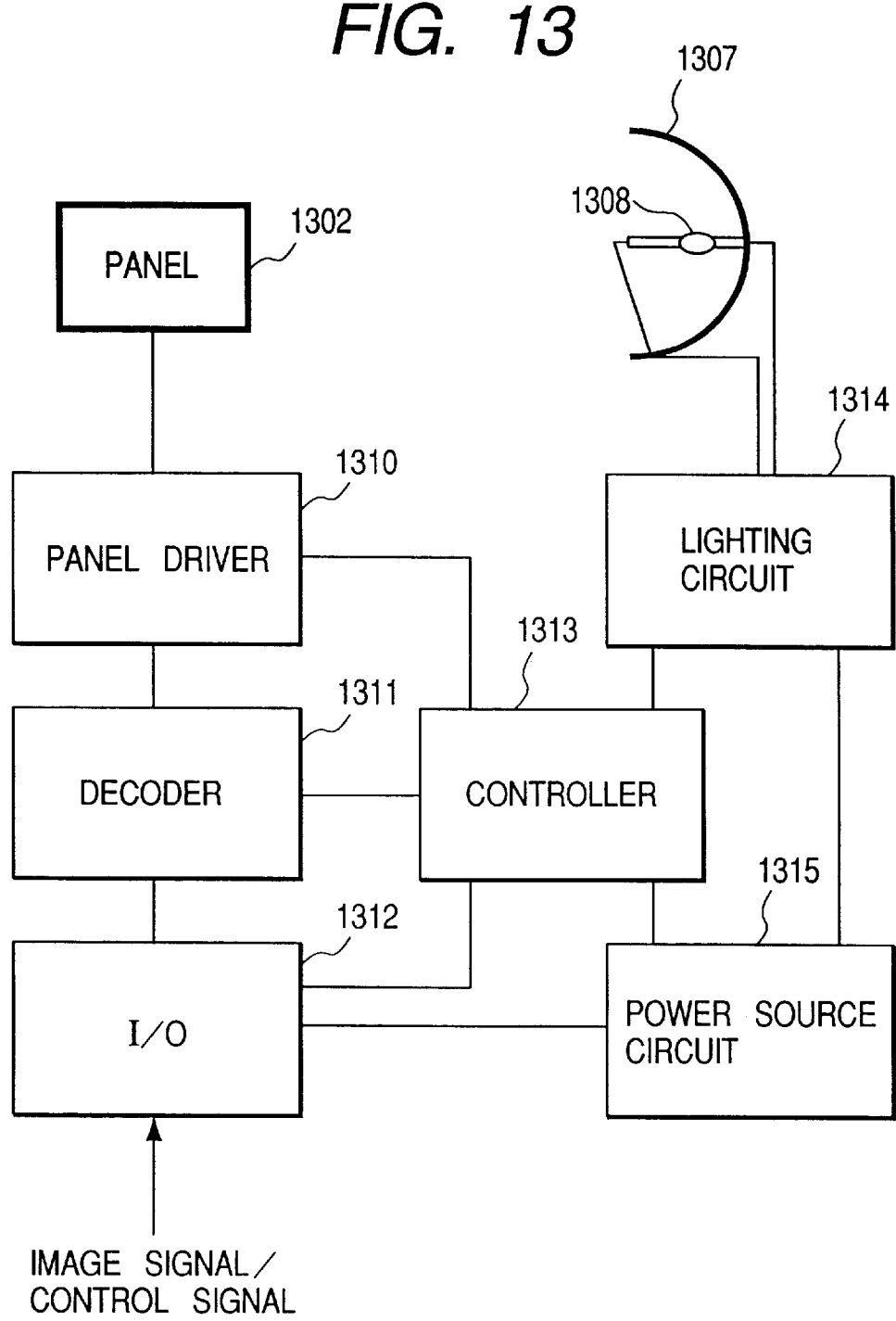
FIG. 13 is a schematic block diagram of the drive circuit of a projection type liquid crystal display apparatus according to the invention.

FIG. 13 is a schematic block diagram of the drive circuit of the embodiment of projection type liquid crystal display apparatus. Reference numeral 1310 denotes a panel driver for inverting the polarity of each RGB picture signal and producing liquid crystal drive signals with a voltage amplified in a predetermined fashion and also drive signals and various timing signals for the opposite electrode 1324. Reference numeral 1312 denotes an interface for decoding various picture signals and control transmission signals into standard picture signals and standard control signals respectively. Reference numeral 1311 denotes a decoder for decoding/transforming the standard picture signals from the interface 1312 into picture signals for the RBG primary colors and synchronizing signals, or video signals adapted to the liquid crystal panel 1302. Reference numeral 1314 denotes a lighting circuit for driving and lighting the arc lamp 1308 in the elliptic reflector 1307. Reference numeral 1315 denotes a power supply circuit for feeding the circuit blocks with power. Reference numeral 1313 denotes a controller containing a control panel (not shown) for comprehensively controlling the circuit blocks. Thus, it will be seen that a projection type liquid crystal display apparatus according to the invention comprises a drive circuit that is rather popular and common to any known single panel type projectors. In other words, a liquid crystal display apparatus according to the invention can display high quality images free from the mosaic of RGB as shown in FIG. 19 without applying any heavy load on the drive circuit.

Figure 15:
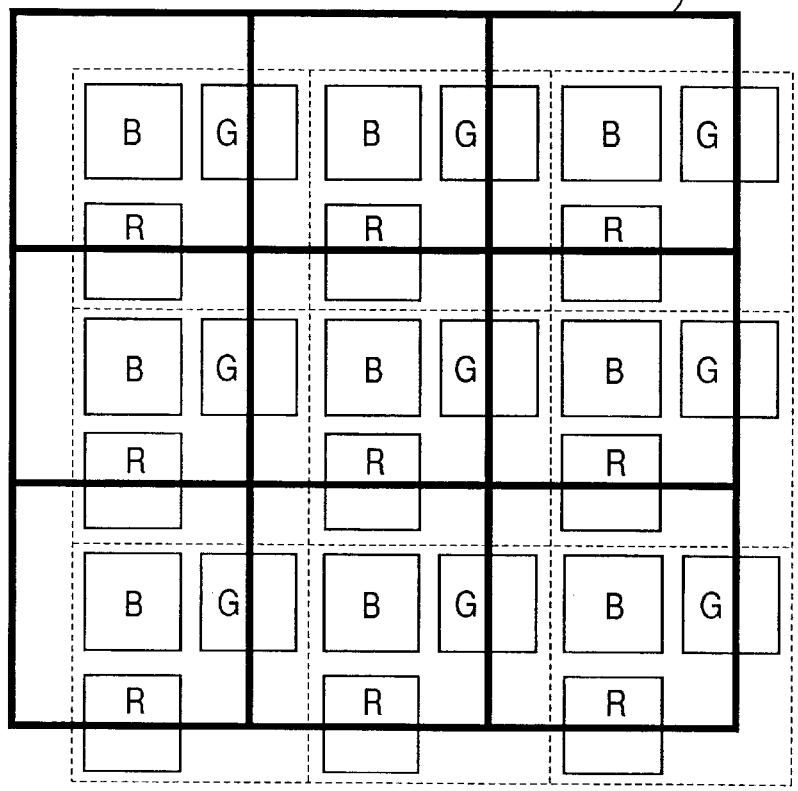
FIG. 15 is an enlarged schematic partial plan view of another embodiment of liquid crystal panel according to the invention.

FIG. 15 is an enlarged partial plan view of another liquid crystal panel that can be used for this embodiment. In this panel, each B pixel electrode 1326b is arranged right below a corresponding micro-lens 1322 and sided transversally by a pair of G pixel electrodes 1326g and longitudinally by a pair of R pixel electrodes 1326r. With this arrangement, the panel operates exactly same as the above described panel as B light is made to strike it perpendicularly while R/G light is made to enter it slantly (with a same angle of incidence but in different directions) so that the beams of reflected light of the three primary colors come out of the respective RGB pixel electrodes of the corresponding picture unit through a common micro-lens. Alternatively, each R pixel electrode may be arranged right below a corresponding micro-lens 1322 and sided by a pair of G pixel electrodes and a pair of B pixel electrodes.

Sixth Embodiment

Figure 17A:
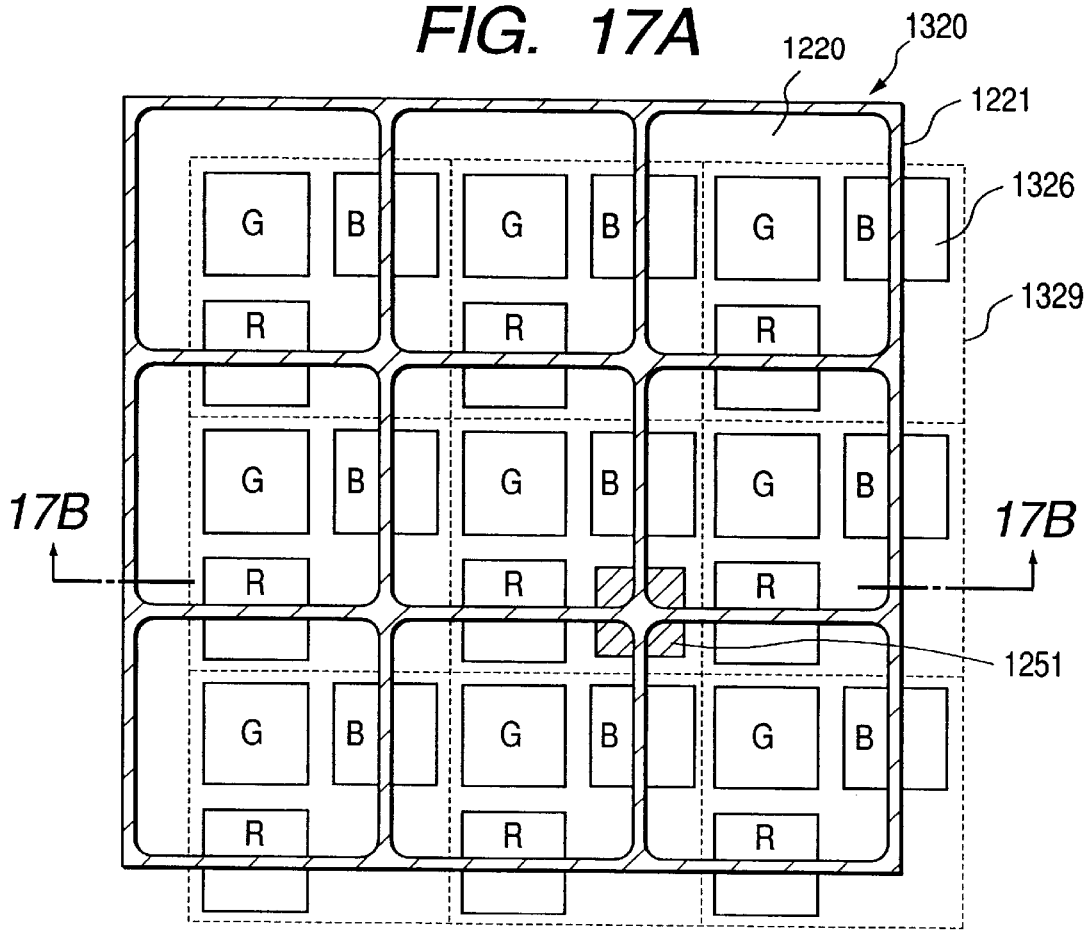
FIGS. 17A and 17B are an enlarged partial plan view and a schematic cross sectional view of still another embodiment of liquid crystal panel according to the invention.
Figure 17B:
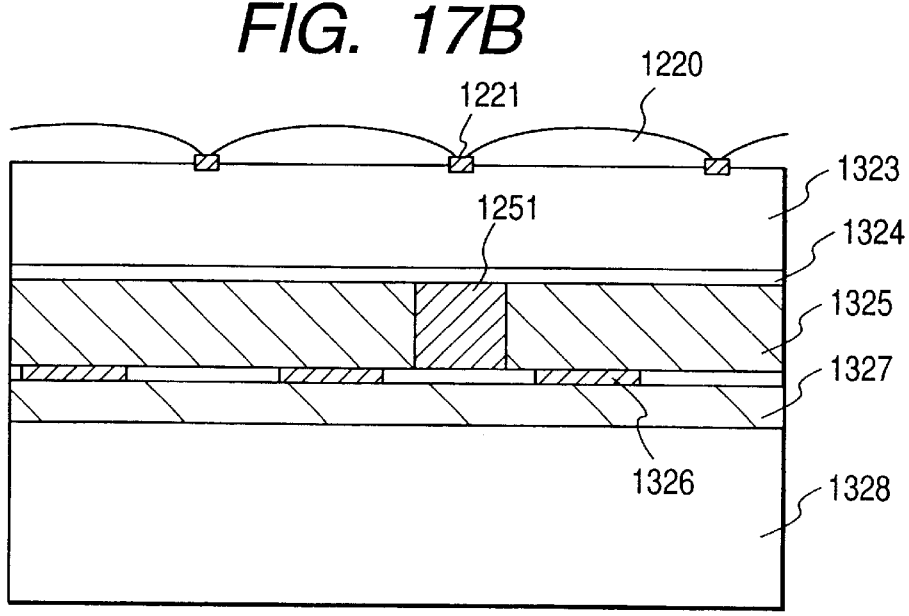

FIG. 16 is an enlarged schematic partial cross sectional view of a sixth embodiment of liquid crystal panel 1320 according to the invention. This embodiment differs from the fifth embodiment in that a piece of sheet glass 1323 is used as opposite glass substrate and the micro-lenses 1220 are formed on the sheet glass 1323 by means of thermoplastic resin and a reflowing technique. Additionally, column spacers 1251 are formed in non-pixel areas by means of photosensitive resin and photolithography. FIG. 17A shows a schematic partial plan view of the liquid crystal panel 1320. As seen, column spacers 1251 are formed in non-pixel areas at selected corners of the micro-lenses 1220 at a predetermined pitch. FIG. 17B shows a schematic cross sectional view of the embodiment taken along line 17B—17B in FIG. 17A and across a column spacer 1251. Column spacers 1251 are preferably arranged at a pitch of every 10 to 100 pixels so as to show a matrix. Care has to be taken so that the number of column spacers can satisfy the two contradictory requirements of the planeness of the sheet glass 1323 and the pourability of liquid crystal.

Still additionally, a light shielding layer 1221 of patterned metal film is arranged in this embodiment to prevent stray light from entering through boundary areas of the micro-lenses. This can effectively prevent any degradation of color saturation and contrast due to stray light. Thus, a projection type display apparatus comprising the embodiment of liquid crystal panel can display images of even higher quality particularly in terms of color saturation and contrast.

Any of the fourth through sixth embodiments of liquid crystal panel or projection type display apparatus described above can be made to display sharp and well defined images by using an LCD panel unit comprising liquid crystal pixels as described earlier by referring to the first through third embodiments, where a highly uniform surface layer is realized including areas around the chips and both the distance between the holding substrate and the projection lens and the position of the local point are rigidly secured.

As described above, according to the invention, an LCD panel is arranged directly on the top of the protuberances of a holding substrate having a uniform height. Thus, the distance between the image displaying plane of the LCD panel and the rear surface of the holding substrate are made even and uniform so that the projected image is held in focus over the entire display screen to make the image very clear and sharp.

Additionally, an adhesive agent containing no filler material is applied to the protuberances of the holding substrate to securely bond the LCD panel to the substrate with an improved thermal conductivity.

The overall thermal conductivity can be further improved by using an adhesive agent containing a filler material in areas other than the protuberances. Then, the temperature rise during the operation of the LCD panel can be reduced by about 15° C.

Meanwhile, a projection type liquid crystal display apparatus according to the invention comprises a reflection type liquid crystal panel provided with micro-lenses and an optical system adapted to emit beams of light of the three primary colors in different respective directions but, once modulated and reflected by the liquid crystal, the beams from each picture unit of RGB pixels of moves through a same micro-lens. Then, the color images displayed by the apparatus are of high quality and free from a mosaic appearance of RGB.

Finally, the flux of light from each pixel is collimated as it passes through the micro-lens array twice so that a projection lens that has a small numerical aperture and hence is not expensive can be used to project bright images onto the screen.

What is claimed is:

1. A reflection type LCD panel unit comprising:

a reflection type LCD panel comprising a driving substrate for driving a reflection type liquid crystal and an opposite substrate which is substantially transparent to receive incident light and arranged so as to sandwich a liquid crystal layer therebetween; and a holding substrate for fixing said LCD panel, separated from and facing the driving substrate side of the LCD panel, said holding substrate having a plurality of protuberances to support said LCD panel, said protuberances having uniform heights as measured from a rear surface of said holding substrate, said holding substrate and said driving substrate being rigidly secured to each other by an adhesive agent.

2. A liquid crystal panel according to claim 1, wherein the distance between said holding substrate and said driving substrate is held to a constant value by holding the surfaces of said plurality of protuberances in contact with said driving substrate.

3. A liquid crystal panel according to claim 1, wherein said holding substrate is made of a metal material.

4. A liquid crystal panel according to claim 1, wherein said adhesive agent contains a filler material.

5. A liquid crystal panel according to claim 4, wherein said filler material is used in areas other than the contact areas of said protuberances and said driving substrate.

6. A liquid crystal panel according to claim 1, wherein said pair of substrates comprises a matrix substrate having pixel electrodes arranged in the form of a matrix and an opposite substrate having a transparent electrode arranged opposite to said pixel electrodes.

7. A liquid crystal panel according to claim 6, wherein a piece of sheet glass is arranged on said opposite substrate.

8. A liquid crystal panel according to claim 7, wherein a plurality of micro-lenses are arranged on said sheet glass.

9. A liquid crystal panel according to claim 8, wherein each of said micro-lenses corresponds to three of said pixel electrodes.

10. A liquid crystal projector comprising a liquid crystal panel according to claim 1.

11. A liquid crystal projector according to claim 10, wherein at least three reflection type liquid crystal panels are arranged so as to be irradiated by rays of light of the three primary colors respectively, blue light being separated by means of a high reflection mirror and a blue reflecting dichroic mirror, red light and green light being separated by a red reflecting dichroic mirror and a green/blue reflecting dichroic mirror.

12. A liquid crystal panel according to claim 1, wherein said protuberances directly contact said driving substrate.

13. A liquid crystal panel according to claim 1, wherein said adhesive agent is interposed between said protuberances and said driving substrate.

14. A liquid crystal panel according to claim 1, wherein said adhesive agent is interposed between a portion of said holding substrate and said driving substrate except for said protuberances.

15. A liquid crystal panel comprising: a pair of substrates; a liquid crystal layer arranged between said substrates; and a holding substrate which fixes one of said substrates on a surface thereof at a predetermined distance, said holding substrate and said one of the substrates are rigidly secured to each other by means of an adhesive, wherein said holding substrate comprises a plurality of thermally conductive protuberances formed on the surface of said holding substrate at a side thereof, said protuberances being formed of the same material as said holding substrate in order to dispose said one substrate at said predetermined distance, and wherein said one substrate is fixed to said plurality of protuberances at said predetermined distance.

\* \* \* \* \*

UNITED STATES PATENT AND TRADEMARK OFFICE
CERTIFICATE OF CORRECTION

PATENT NO. : 6,563,562 B2
DATED : May 13, 2003
INVENTOR(S) : Takayuki Ishii et al.

It is certified that error appears in the above-identified patent and that said Letters Patent is hereby corrected as shown below:

Column 2,
Line 35, "above described" should read -- above-described --.

Column 3,
Line 7, "an" should read -- a --.

Column 6,
Line 47, "contrasty" should read -- contrasted --.

Column 7,
Line 10, "contrasty" should read -- contrasted --.

Column 8,
Line 13, "ther" should read -- there --.

Column 11,
Line 34, "slantly" should read -- slantedly --.

Column 12,
Line 24, "slantly" should read -- slantedly --.

Signed and Sealed this

Sixth Day of January, 2004

JAMES E. ROGAN
*Director of the United States Patent and Trademark Office*

UNITED STATES PATENT AND TRADEMARK OFFICE
CERTIFICATE OF CORRECTION

PATENT NO. : 6,563,562 B2
DATED : May 13, 2003
INVENTOR(S) : Takayuki Ishii et al.

It is certified that error appears in the above-identified patent and that said Letters Patent is hereby corrected as shown below:

Column 2,
Line 35, "above described" should read -- above-described --.

Column 3,
Line 7, "an" should read -- a --.

Column 6,
Line 47, "contrasty" should read -- contrasted --.

Column 7,
Line 10, "contrasty" should read -- contrasted --.

Column 8,
Line 13, "ther" should read -- there --.

Column 11,
Line 34, "slantly" should read -- slantedly --.

Column 12,
Line 24, "slantly" should read -- slantedly --.

Signed and Sealed this

Thirteenth Day of January, 2004

JON W. DUDAS
*Acting Director of the United States Patent and Trademark Office*